United States Patent [19]
Hegardt et al.

[11] Patent Number: 5,154,616
[45] Date of Patent: Oct. 13, 1992

[54] ANSWER SHEET COVERING DEVICE

[76] Inventors: Ronald D. Hegardt, 5895 Friars Rd., Suite 5110, San Diego, Calif. 92110; Scott Baird, 17549 Matinal Rd., San Diego, Calif. 92127

[21] Appl. No.: 644,322

[22] Filed: Jan. 22, 1991

[51] Int. Cl.⁵ .................................. G09B 3/00
[52] U.S. Cl. ........................... 434/358; 434/363; 434/364
[58] Field of Search ............. 434/358, 348, 199, 364, 434/328, 363, 173, 175; 235/487

[56] References Cited

U.S. PATENT DOCUMENTS

| | | | |
|---|---|---|---|
| 3,089,260 | 5/1963 | Gray | 434/364 |
| 3,995,381 | 12/1976 | Manfred et al. | 434/358 |

FOREIGN PATENT DOCUMENTS 1199413  12/1959  France .......................... 434/348

*Primary Examiner*—Richard J. Apley
*Assistant Examiner*—Glenn E. Richman
*Attorney, Agent, or Firm*—K. David Crockett

[57] ABSTRACT

An apparatus for obstructing a standardized test form from view of all but the test taker. The apparatus permits a test taker to see the necessary portions of the answer sheet but obstructs and obscures the view of answer marks from shallow angles or from a distance.

16 Claims, 1 Drawing Sheet

ANSWER SHEET COVERING DEVICE

FIELD OF THE INVENTION

The present invention relates to the field of academic testing, specifically to devices and methods used to discourage cheating on multiple choice tests using standardized answer sheets.

BACKGROUND OF THE INVENTION

Standardized multiple choice answer sheets and systems which automatically grade those answer sheets are in widespread use in American education. These tests represent a quick, easy and inexpensive way to test large numbers of people for basic skills and specific skills taught in the classroom. Standardized tests such as the Scholastic Aptitude Test are widely used by universities to screen applicants. Similar standardized tests are also used to measure progress and assign grades in grammar school, high school, college and post-graduate courses.

While the standardized test has great advantages in cost, speed, and objectivity, it also presents test-takers with a number of means which make it easy to cheat. While essay tests and standardized multiple choice tests both allow some cheating, the format and method of the standardized multiple choice answer sheet provide several advantages for would-be cheaters.

The method of taking a standardized multiple choice test is simple. The examiner provides a standardized multiple choice test consisting of a list of sequentially numbered questions. Each question has a number of possible answers, usually labelled as answers "A," "B," "C," etc. or "true" and "false." The examiner also provides a standardized multiple choice answer sheet which is pre-marked with a matrix of answer spaces. Typically, each row of answer spaces in the matrix is assigned a number, marked on the left margin of the answer sheet, which corresponds to the number of the test question which is to be answered in that row. Each answer space in the row of answer spaces is typically assigned a letter, marked at the top of the answer sheet, which corresponds to the answer choices available on the standardized test. To answer each question, the test-taker places a mark in the answer space which corresponds to the chosen answer for the question in the row of answer spaces which correspond to the question being answered. The test-taker's only response to each question is a small mark. This small mark represents a minimal amount of information needed to relay a correct answer to the grader. It also represents a minimal amount of information necessary to be misappropriated by a would-be cheater. The small amount of information necessary for cheating makes cheating quite easy, and this form of cheating is widespread.

Other features of the standardized multiple choice answer sheet facilitate cheating. The answer sheets typically are made of white or light colored paper and require marks with a dark pen or pencil to make a mark of sufficiently high contrast to allow automatic grading. This high contrast between the answer mark and the background of the answer sheet also facilitates cheating by making each answer mark easier to see from a distance. The answer sheets typically contain a number of markings designed to facilitate testing and automatic grading. These marks include the control mark columns, repeated answer choice letter assignments and identification areas. Logos, trademarks, form numbers, copyright notices and patent numbers are also placed on the answer sheet by the manufacturer. These marks on the answer sheet also provide useful landmarks for the would-be cheater, making it easier to determine which answer the cheater has viewed from afar.

To maintain the integrity of the testing process, examiners employ several methods and devices to combat cheating on the standardized multiple choice tests. Proctors are often used to visually detect attempts by would-be cheaters to view the answer sheets of other test takers. Examinees are often seated far apart, in "every other seat," to make viewing of other answer sheets difficult. The Low Visibility Answer Sheet of U.S. Pat. No. 3,995,381, in which the answer spaces are pre-darkened in order to lower the contrast between the answer mark and the answer space, is used to make cheating more difficult by making it more difficult to see a difference between the marked and unmarked answer spaces. Despite the use of the Low Visibility Answer Sheet, examiners must continue to combat cheating with proctors and dispersed seating. Despite the use of all three means of combatting cheating, examiners continue to perceive a widespread cheating problem in standardized testing.

SUMMARY OF THE INVENTION

It is the principal object of this invention to prevent cheating on standardized multiple choice tests by obstructing the low angle view of answer marks. Another object of the invention is to prevent cheating on standardized multiple choice tests by obstructing from view any landmarks on the answer sheets which might be used by cheaters to facilitate correspondence of viewed answers with those landmarks. It is also an object of this invention to discourage cheating by eliminating the visual contrast between the background of the answer sheet and any answer marks placed upon the answer sheet.

These and other useful objects are achieved by the present invention which is a device which covers the standardized multiple choice answer sheet with a dark, opaque, reflective and thick cover sheet. Because test-takers are usually seated at or near the same level, they view the answer sheets of other test-takers from a low angle relative to the desktop on which the answer sheet is used. While providing small apertures over each correspondence number and letter and each answer space to allow the examinee to see those areas from a high angle directly above the answer sheet and mark those answers with a pen or pencil, the covering is thick enough to effectively block the view of those answer areas from a low angle. The cover sheet also completely darkens the background and makes it more difficult to distinguish a marked answer from the entire background. In this manner, cheating is made significantly more difficult and is thus discouraged. The cover sheet may be reflective, marked, mottled or textured to confuse the background surrounding the answer marks, thereby making cheating more difficult.

DETAILED DESCRIPTION

Figure 1:
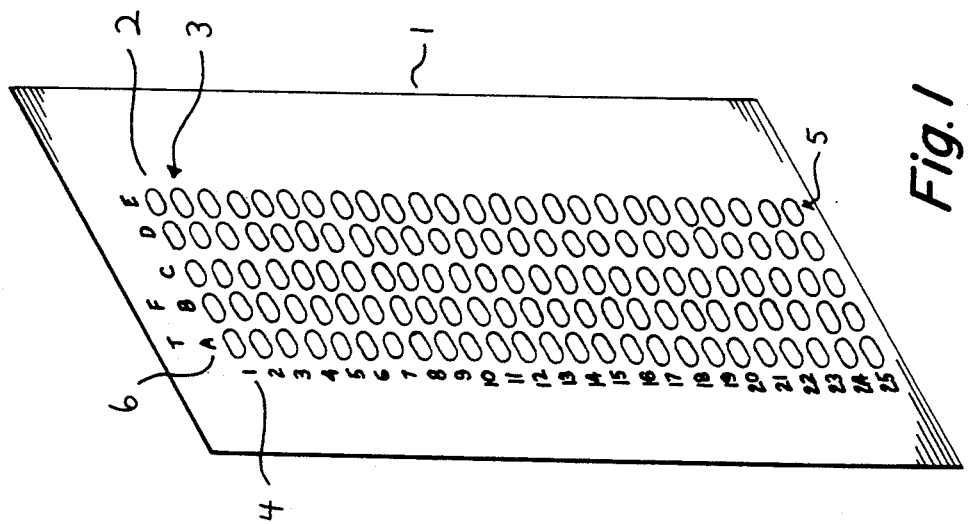
FIG. 1 is a sketch of the typical standardized multiple choice answer sheet.

Referring now to FIG. 1, a standardized multiple choice answer sheet (1) is pre-marked with answer spaces (2) arranged in rows of answer spaces (3). Each row of answer spaces is marked with a correspondence number (4) which corresponds to a question on a standardized multiple choice test. The rows of answer spaces are arranged vertically, forming columns of answer spaces (5). Each column of answer spaces is marked with a correspondence letter (6) which corresponds to a possible answer to each question.

Figure 2:
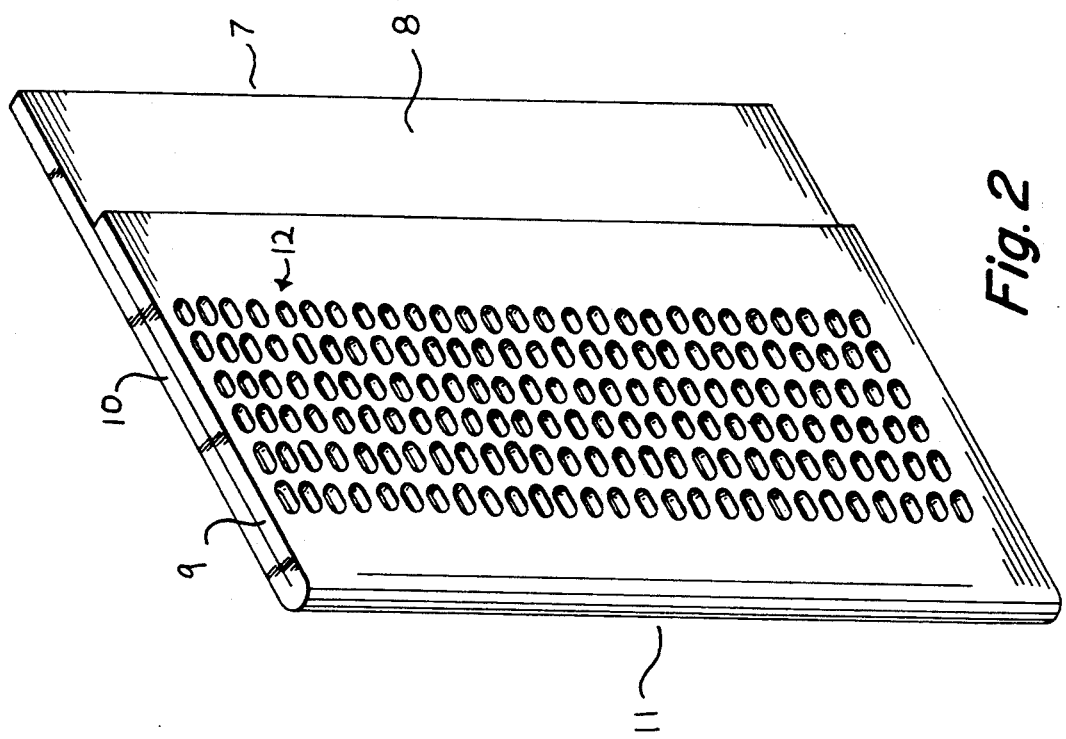
FIG. 2 is a sketch of the answer sheet covering device.

Referring now to FIG. 2, the answer sheet covering device (7) consists of a single rectangular flat sheet of plastic (8) folded in such a manner as to form a cover sheet (9) and backing sheet (10) joined by the crease (11). The cover sheet (9) is provided with a matrix of apertures (12) which correspond to the answer spaces (2), correspondence numbers (4) and correspondence letters (6) of the answer sheet. To use the covering device with the answer sheet, the answer sheet is slipped into the covering device so that the answer spaces (2), correspondence numbers (4) and correspondence letters (6) appear through the apertures (12) of the cover sheet. The cover sheet is of sufficient thickness so that the answer areas may only be viewed from a high angle, almost directly above the answer sheet. The answer spaces cannot be viewed from a low angle. Additional barriers to cheating are obtained by the dark color of the cover sheet (9), which minimizes the visual contrast between the background and the answer marks. The contrast to the examinee, between the background and the answer marks, is maintained by the difference in material and depth between the cover sheet (9) and the answer sheet (1). Additional barriers to cheating are obtained by the reflectivity or marking or texture of the cover sheet (9), which themselves discourage cheating and make it possible to make the device of a very thin material and forsake the further advantages of making the device thick enough to block low angle view.

The folder which is formed by the cover sheet (9), the backing sheet (10) and the crease (11) provides a means to hold the answer sheet in alignment with the cover sheet. The crease provides adequate compressive force to grip the answer sheet and hold it firmly in place. The cover sheet is made of plastic or material of a plastic nature, and the compressive force of the folder is adequate to hold the answer sheet in alignment during normal movements of the assembly. This allows the covering device and answer sheet to be moved about at will without disturbing the alignment between the answer sheet and the cover sheet, thus freeing test takers from the annoyance of constant realignment.

While the preferred embodiment of the invention has been described, it is merely illustrative of the principles of the invention. Other embodiments and configurations may be devised without departing from the spirit of the invention and the scope of the appended claims.

What is claimed is:

1. An answer sheet covering device to be used in conjunction with a marking device and a standardized answer sheet having an answer matrix comprising a multiplicity of answer spaces, said answer spaces marked by question correspondence indicia and answer correspondence indicia, said answer sheet also having a straight edge, said answer sheet covering device comprising:

a flat cover sheet of any material, said sheet sized and dimensioned so as to substantially cover the answer sheet and having a plurality of holes sized and dimensioned to approximate the size of the correspondence indicia and arranged in patterns which correspond to the answer spaces and correspondence indicia on the answer sheet, whereby the answer sheet may be placed under the cover sheet and the answer spaces and correspondence indicia appear through the holes, said holes sized and dimensioned so as to allow a marking device to be inserted through the holes in order to mark the answer sheet; and a straight aligning edge on the cover sheet, said straight aligning edge corresponding to the straight edge of the answer sheet and arranged relative to the holes of the cover sheet and the answer spaces and correspondence indicia of the answer sheet so as to align the holes with the answer spaces and correspondence indicia when the straight edge of the answer sheet is aligned with the straight edge of the cover sheet; and a backing sheet, having at least one straight edge, coplanar and lying under the cover sheet with the straight aligning edge, said straight edge of the backing sheet joined to the straight aligning edge of the cover sheet thereby forming a folder in which the answer sheet is inserted, said joint between the cover sheet and the backing sheet serving to align the answer sheet under the cover sheet; and means for joining the backing sheet to the cover sheet along the straight aligning edge of the cover sheet and the straight edge of the backing sheet; and means for providing compressive force between the cover sheet and the backing sheet which serves to hole the answer sheet in place during use.

2. The answer sheet covering device of claim 1 wherein the cover sheet and the backing sheet are formed of a single sheet of plastic material, provided with a matrix of holes corresponding to the answer matrix and correspondence indicia of the answer sheet, said single sheet folded so as to form a folder with a crease, a cover sheet portion and a backing sheet portion, said crease serving as the aligning edge and the means for joining the cover sheet portion to the backing sheet portion, said crease providing compressive force between the cover sheet portion and the backing sheet portion which serves to hold the answer sheet in place during use.

3. The device of claim 1, wherein the cover sheet is opaque.

4. The device of claim 1, wherein the cover sheet is dark in color.

5. The device of claim 1, wherein the cover sheet is reflective.

6. The device of claim 1, wherein the cover sheet is light in color and is marked with a multiplicity of dark marks of approximately the same size as the holes in the cover sheet.

7. A method for the prevention of cheating on multiple choice tests using standardized answer sheets with a matrix of answer spaces and correspondence indicia, wherein the answer sheet is placed in the answer sheet covering device of claim 1 during testing so that the answer spaces and correspondence indicia are aligned with the holes of the answer sheet covering device, thus obscuring the landmarks on the answer sheet from the view of test takers.

8. A method for the prevention of cheating on multiple choice tests using standardized answer sheets with a matrix of answer spaces and correspondence indicia, wherein the answer sheet is placed in the answer sheet covering device of claim 2 during testing so that the answer spaces and correspondence indicia are aligned with the holes of the answer sheet covering device, thus obscuring the landmarks on the answer sheet from the view of test takers.

9. An answer sheet covering device to be used in conjunction with a marking device and a standardized answer sheet having an answer matrix comprising a multiplicity of answer spaces, said answer spaces marked by question correspondence indicia and answer correspondence indicia, said answer sheet also having a straight edge, said answer sheet covering device comprising:

- a flat cover sheet of any material, said sheet sized and dimensioned so as to substantially cover the answer sheet and having a plurality of holes sized and dimensioned to approximate the size of the correspondence indicia and arranged in patterns which correspond to the answer spaces and correspondence indicia on the answer sheet, whereby the answer sheet may be placed under the cover sheet and the answer spaces and correspondence indicia appear through the holes, said holes sized and dimensioned so as to allow a marking device to be inserted through the holes in order to mark the answer sheet, said cover sheet of sufficient thickness so that the answer spaces may be viewed only from an angle nearly perpendicular to the plane of the answer sheet; and
- a straight aligning edge on the cover sheet, said straight aligning edge corresponding to the straight edge of the answer sheet and arranged relative to the holes of the cover sheet and the answer spaces and correspondence indicia of the answer sheet so as to align the holes with the answer spaces and correspondence indicia when the straight edge of the answer sheet is aligned with the straight edge of the cover sheet; and
- a backing sheet, having at least one straight edge, coplanar and lying under the cover sheet with the straight aligning edge, said straight edge of the backing sheet joined to the straight aligning edge of the cover sheet thereby forming a folder in which the answer sheet is inserted, said joint between the cover sheet and the backing sheet serving to align the answer sheet under the cover sheet; and
- means for joining the backing sheet to the cover sheet along the straight aligning edge of the cover sheet and the straight edge of the backing sheet; and
- means for providing compressive force between the cover sheet and the backing sheet which serves to hold the answer sheet in place during use.

10. The answer sheet covering device of claim 9 wherein the cover sheet and the backing sheet are formed of a single sheet of plastic material, provided with a matrix of holes corresponding to the answer matrix and correspondence indicia of the answer sheet, said single sheet folded so as to form folder with a crease, a cover sheet portion and a backing sheet portion, said crease serving as the aligning edge and the means for joining the cover sheet portion to the backing sheet portion, said crease providing compressive force between the cover sheet portion and the backing sheet portion which serves to hold the answer sheet in place during use.

11. The device of claim 9, wherein the cover sheet is opaque.

12. The device of claim 9, wherein the cover sheet is dark in color.

13. The device of claim 9, wherein the cover sheet is reflective.

14. The device of claim 9, wherein the cover sheet is light in color and is marked with a multiplicity of dark marks of approximately the same size as the holes in the cover sheet.

15. A method for the prevention of cheating on multiple choice tests using standardized answer sheets with a matrix of answer spaces and correspondence indicia, wherein the answer sheet is placed in the answer sheet covering device of claim 9 during testing so that the answer spaces and correspondence indicia are aligned with the holes of the answer sheet covering device, wherein test takers are seated sufficiently far apart so their view of the covered answer sheets of other test takers is at such a low angle that the thickness of the covering sheet effectively blocks their view of marked answers of other test takers.

16. A method for the prevention of cheating on multiple choice tests using standardized answer sheets with a matrix of answer spaces and correspondence indicia, wherein the answer sheet is placed in the answer sheet covering device of claim 10 during testing so that the answer spaces and correspondence indicia are aligned with the holes of the answer sheet covering device, wherein test takers are seated sufficiently far apart so their view of the covered answer sheets of other test takers is at such a low angle that the thickness of the cover sheet effectively blocks their view of marked answers of other test takers.

* * * * *